(12) United States Patent
Grau et al.

(10) Patent No.: US 12,083,575 B2
(45) Date of Patent: Sep. 10, 2024

(54) DEVICE AND METHOD FOR PRODUCING A THIN-WALLED COMPONENT

(71) Applicant: VOLKSWAGEN AKTIENGESELLSCHAFT, Wolfsburg (DE)

(72) Inventors: Frederik Grau, Braunschweig (DE); Kartik Jamadar, Wolfsburg (DE); Christian Theuerkauf, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/142,003

(22) Filed: Jan. 5, 2021

(65) Prior Publication Data
US 2021/0205874 A1    Jul. 8, 2021

(30) Foreign Application Priority Data

Jan. 6, 2020   (DE) ..................... 10 2020 100 102.9

(51) Int. Cl.
*B21D 51/16*    (2006.01)
*B21D 26/14*    (2006.01)
(Continued)

(52) U.S. Cl.
CPC ............ *B21D 51/16* (2013.01); *B21D 26/14* (2013.01); *B21D 35/00* (2013.01); *H01M 50/105* (2021.01)

(58) Field of Classification Search
CPC ...... B21D 51/16; B21D 26/14; B21D 28/007; B21D 35/00; B21D 35/001; H01M 50/105; H01M 50/124; B26D 5/086
(Continued)

(56) References Cited

U.S. PATENT DOCUMENTS

| 6,564,605 | B1 | 5/2003 | Gafri et al. |
| 6,708,542 | B1 | 3/2004 | Gafri et al. |
| 7,487,655 | B2 * | 2/2009 | Imamura ................ B21D 53/16 |
| | | | 72/430 |

(Continued)

FOREIGN PATENT DOCUMENTS

| CN | 1284901 A | 2/2001 |
| DE | 1809070 | 7/1970 |

(Continued)

OTHER PUBLICATIONS

Search report for German Patent Application No. 10 2020 100 102.9, mailed Sep. 11, 2020.

(Continued)

*Primary Examiner* — Christopher L Templeton
*Assistant Examiner* — Teresa A Guthrie
(74) *Attorney, Agent, or Firm* — PEARL COHEN ZEDEK LATZER BARATZ LLP

(57) ABSTRACT

A device and method for producing a thin-walled component, in particular a housing film for a pouch cell, from an initial part, comprising a first coil body, an electrical circuit for providing a pulsed electrical current, a die with a support facing the first coil body for the initial part to be reshaped, the support having the shape of the component to be produced, and a first separating device by which a first partial area can be at least partially separated from a second partial area of the initial part, it being possible for the initial part to be arranged between the first coil body and the die, to be accelerated by an electromagnetic force acting between the first coil body and the initial part towards the die and thereby to be deformed by the support and to be at least partially separated by the first separating device.

14 Claims, 2 Drawing Sheets

(51) Int. Cl.
    *B21D 35/00*     (2006.01)
    *H01M 50/105*     (2021.01)

(58) Field of Classification Search
    USPC .................................... 72/376, 55; 29/419.2
    See application file for complete search history.

(56) References Cited

U.S. PATENT DOCUMENTS

| | | | | |
|---|---|---|---|---|
| 8,261,591 | B2 * | 9/2012 | Hielscher | B21D 28/24 |
| | | | | 72/348 |
| 11,577,447 | B2 | 2/2023 | Jung et al. | |
| 2005/0034497 | A1 | 2/2005 | Steingroever | |
| 2005/0217334 | A1 | 10/2005 | Bradley et al. | |
| 2005/0229377 | A1 | 10/2005 | Bradley et al. | |
| 2008/0229795 | A1 | 9/2008 | Toeniskoetter | |
| 2013/0086961 | A1 | 4/2013 | Yablochnikov et al. | |
| 2020/0406528 | A1 * | 12/2020 | Jung | B29D 99/00 |

FOREIGN PATENT DOCUMENTS

| | | |
|---|---|---|
| DE | 103 37 769 B3 | 6/2004 |
| DE | 10 2010 039 435 A1 | 2/2012 |
| JP | S6163322 A | 4/1986 |
| JP | 2004130349 A | 4/2004 |
| JP | 2007296553 A | 11/2007 |
| KR | 101494137 B1 | 2/2015 |
| KR | 101504478 B1 | 3/2015 |
| WO | WO 99/33591 | 7/1999 |
| WO | WO 2019/151635 A1 | 8/2019 |

OTHER PUBLICATIONS

Office Action for Chinese Patent Application No. 202110011420.X, dated Sep. 30, 2022.

Search Report for European Patent Application No. 20216905, dated May 21, 2021.

* cited by examiner

DEVICE AND METHOD FOR PRODUCING A THIN-WALLED COMPONENT

CROSS REFERENCE TO RELATED APPLICATION

This application claims priority from German Patent Application. No, 10 2020 100 102.9, filed Jan. 6, 2020, which is incorporated herein by reference.

BACKGROUND OF THE INVENTION

The present invention is directed to a device and to a method for producing a thin-walled component. The component is, in particular, a film containing aluminum, in particular a composite film made of aluminum laminate. The component is used, in particular, as a housing for a pouch cell. The housing is used for enclosing a cell stack comprising electrodes and separators.

Films made from aluminum laminate for pouch cells have poor deep drawing capability. Cracks and folds can occur in the partial areas of the film that are highly stressed by the reshaping. Furthermore, only a short cycle time can be achieved with conventional deep drawing. In addition, the friction between the deep drawing punch and the film causes a high energy loss. The steps of deep drawing and of detaching partial areas regularly take place in separate processes, so that complex material handling and long process times are required.

Until now, these disadvantages have been countered with the following measures: raising the aluminum content in the foil, which increases material costs and weight of the foil; raising the temperature of the film during reshaping, which increases the process costs and adversely affects the quality of the aluminum laminate; retouching the blank holder during deep drawing, which is a time-consuming measure.

A method for producing a fuel cell plate is known from US 2005/0217334 A1. The device used for this purpose comprises an electromagnetic actuator and a die. A film material which has electrical conductivity is arranged between the die and the actuator.

The actuator generates a magnetic field which induces a voltage in the film material. As a result of the Lorentz force generated in the process, the film material is accelerated away from the actuator and towards the die. Due to the high speed of the film material, it is reshaped when it hits the die. The film material shows hyperplastic behavior.

A method for welding two components is known from US 2013/0086961 A1. The components are brought into contact with one another. An electrical pulse acts on one component.

SUMMARY OF THE INVENTION

The object of the present invention is to at least partially solve the problems set forth with reference to the prior art. In particular, the production of a thin-walled component should be made possible through the use of electromagnetic forces. The components should be able to be produced in a reproducible manner and/or with a particularly high quality, and, if necessary, it should also be possible to produce them cost-effectively.

A device with the features according to an independent claim and a method according to an independent claim contribute to achieving these objects. Advantageous further developments are the subject matter of the dependent claims. The features listed individually in the claims can be combined with one another in a technologically sensible manner and can be supplemented by explanatory facts from the description and/or details from the figures, further embodiment variants of the invention being shown.

A device for producing a thin-walled component from an initial part is proposed. The device comprises at least:
- a first coil body, the electrical conductor of which is arranged at least in one plane,
- an electrical circuit for providing a pulsed electrical current which can be applied to the electrical conductor of the first coil body,
- a die with a support facing the first coil body for an initial part to be reshaped, the support having the shape of the component to be produced, and
- a first separating device by which a first partial area can be at least partially separated from a second partial area of the initial part.

The device is designed or set up in such a way that the initial part can be arranged between the first coil body and the die, can be accelerated towards the die by an electromagnetic force acting between the first coil body and the initial part, and can be reshaped by the support and can be at least partially separated by the first separating device.

In particular, the pulsed electrical current provided by the electrical circuit generates a magnetic field in the first coil body, which in turn induces an electrical current in the initial part. Thus, a Lorentz force, by which the initial part or parts of the initial part are accelerated towards the die, is generated between the initial part and the first coil body. The high speed of the initial part achieved in this way enables reshaping of the die by the initial part, that is, the adaptation of the shape of the initial part to the shape of the support.

The pulsed electrical current is provided, in particular, via an electrical capacitor of the electrical circuit. In particular, the capacitor is recharged after each at least partial discharge.

In particular, an aluminum composite film or an aluminum laminate film is used as the initial part. The initial part can also comprise various plastics, in particular as a layer or laminate.

In particular, in addition to the reshaping of the initial part, an at least partial separation of partial areas of the initial part also takes place here. In particular, the at least partial separation includes detachment of a partial area of the initial part, e.g. a perforation or the removal of a border area.

The combination of process steps in the device, namely reshaping and separating, in particular enables cost-effective production. In particular, there is no need to handle the initial part between the reshaping process and the separating process. On the other hand, there is no need for an exact alignment of an already correctly separated but not yet reshaped initial part or a reshaped but not yet separated initial part. This also improves the quality of the component.

In comparison with the known deep drawing, little energy is consumed by this device or by the method that is made possible by the device, in which the initial part is moved by a pulsed electrical current.

During acceleration towards the die, the initial part reaches a speed of more than 100 m/s [meters per second]. In particular, the material of the initial part assumes a viscoplastic state, so that the reshaping behavior of the material is improved. Partially plastic and partially viscous material behavior is designated as viscoplastic behavior. Thus, viscoplastic substances combine characteristics of solids and liquids and are therefore easier to reshape.

In particular, the first separating device has a circumferential separating edge, so that the separating edge completely surrounds the first partial area and the first partial area can be detached from the second partial area. With the separating edge, also referred to as the cutting edge, the partial areas are separated from one another. This means that the component is trimmed with the aid of the separating edge and thus new partial areas are defined.

In particular, the separating edge completely surrounds the support. In particular, the first partial area thus forms the component, and the second partial area is disposed of, for example, as material residue. In particular, the device comprises a type of material chute by which the detached second partial area can be automatically removed from the device, e.g. under the influence of gravity.

The first separating device can also have several separating edges, so that several partial areas are formed which are at least partially separated from other partial areas or are completely detached.

In particular, the separating edge of the first separating device is arranged in a stationary manner on the die. In particular, the initial part is pressed onto the die as a result of the pulsed electrical current, so that the output part is also pressed against the separating edge and thus the separating process takes place. Thus, the reshaping and the separation can take place at the same time.

In particular, the separating edge is designed to be movable and is accelerated together with the initial part towards the die by the same pulsed electrical current. For this, the initial part must be arranged between the die, on the one hand, and the first coil body and the first separating device, on the other hand.

In particular, the device additionally comprises at least one second coil body, by which the first separating device can be moved towards the die. In particular, the first separating device can thus be movable independently of the initial part. The conductor of the second coil body is arranged in a common plane with the conductor of the first coil body. In particular, the second coil body is arranged inside or outside the first coil body.

In particular, further coil bodies are provided so that further separating devices can be moved with a temporal offset from one another or at the same time towards the die.

In particular, the device comprises at least one second coil body and a second separating device, the second separating device being movable by the second coil body towards the die. In particular, the first separating device is arranged on the die.

The separating devices are arranged in such a way that the cutting lines of the separating devices formed on the initial part are positioned at the correct distance from one another. Alternatively or additionally, the movably arranged second separating device and the first separating device arranged on the die work together and form an at least partially or completely common cutting line on the initial part.

In particular, the second coil body completely surrounds the first coil body and the electrical conductors of the coil bodies are arranged in the common plane, the electrical circuit being designed so that the pulsed electrical current can only be applied to the coil bodies one after the other. Thus, the electrical circuit can be constructed very simply and cost-effectively, with alternating switching between the first coil body and the second coil body.

A method for producing a thin-walled component from an initial part with a device is also proposed. The device is in particular the device already described. The device comprises at least:

a first coil body, the electrical conductor of which is arranged at least in one plane, an electrical circuit for providing a pulsed electrical current which can be applied to the electrical conductor of the first coil body, a die with a support facing the first coil body for an initial part to be reshaped, the support having the shape of the component to be produced, and a first separating device by which a first partial area can be at least partially separated from a second partial area of the initial part.

The method for producing the component comprises at least the following steps:
  a) arranging an initial part between the first coil body and the die;
  b) applying the pulsed electrical current to the first coil body and generating an electromagnetic force between the first coil body and the initial part, so that the initial part can be accelerated towards the die;
  c) reshaping the initial part; and
  d) at least partially separating the initial part.

The above classification, which in particular is not exhaustive, of the method steps into a) to d) should serve primarily only for differentiation and not to enforce a sequence and/or dependency. The frequency of the method steps can also vary, for example, during the setting up and/or the operation of the device. It is also possible that method steps overlap one another at least partially in time. Method steps c) and d) take place especially preferably at the same time or at least partially at the same time as one another and after steps a) and b). Steps c) and d) can also be carried out one after the other and in a different order. In particular, at least steps a) and b) are carried out in the order listed, with steps c) and d) being carried out chronologically after steps a) and b).

Steps c) and d) can be (at least partially) carried out at the same time or simultaneously. In particular, step d) takes place during step c).

Steps c) and d) can be carried out with a temporal offset, step c) being carried out by a first pulsed electrical current and step d) being carried out by a temporally offset second pulsed electrical current.

In particular, the initial part is provided as an endless material, so that the component can be produced from the initial part provided as a strip material. Alternatively, the initial part is pre-cut, the partial areas of the initial part which are detached during the method being removed from the device as material residue.

In particular, in step a) the initial part is arranged on the die or on the support.

In order to carry out step b) the first coil body is arranged, in particular, approximately 30 millimeters away from the initial part or from the support.

In particular, the pulsed electrical current generates a Lorentz force of approximately 20 kilonewtons (depending on the geometry of the components used). As a result of the Lorentz force, the initial material is molded onto the support so that the initial material assumes the shape of the support.

At least one control unit is provided which is equipped, configured or programmed to carry out the described method. The control unit is, in particular, a component of the device.

Furthermore, the method can also be carried out by a computer or with a processor of the control unit.

Accordingly, a system for data processing is also proposed which comprises a processor which is adapted/configured in such a way that it carries out the method or some of the steps of the proposed method.

A computer-readable storage medium can be provided which comprises commands which, when executed by a computer/processor, cause the latter to execute the method or at least some of the steps of the proposed method.

A component is also proposed which is produced at least with the described device or by the described method, the component being a housing film for a pouch cell or at least partially forming a housing for a pouch cell. The housing or the housing film can serve to enclose a cell stack comprising electrodes and separators.

In particular, the use of the proposed device for producing a housing film for a pouch cell made of a thin-walled component is proposed.

The statements relating to the method are transferable, in particular, to the device, the component and/or the computer-implemented method (that is to say the computer or the processor, the data processing system, the computer-readable storage medium) and vice versa.

The device or the method enables, in particular, very high processing speeds during reshaping. The reshapability of the material of the initial part is better than with conventional deep drawing due to the viscoplastic behavior generated. This allows a high drawing depth to be achieved. The reshaped material of the initial part or of the component is distributed more homogeneously. Springback of the reshaped material can be reduced. The proposed reshaping requires less energy since, for example, there is no friction between punch/blank holder and workpiece. Little wear and tear occurs on the tools used (separating devices and die). The costs for the provision of the device can be reduced since the separating process and the reshaping process are now combined in a common device.

The use of indefinite articles ("a" and "an"), particularly in the claims and the description reproducing them, is to be understood as such and not as a numeral. Correspondingly, the terms or components thus introduced are to be understood in such a way that they are present at least once and, in particular, can also be present several times.

As a precaution, it should be noted that the numerals used here ("first," "second," . . . ) serve primarily (only) to differentiate between a plurality of similar objects, sizes or processes, and in particular, therefore, do not necessarily prescribe any dependency and/or sequence of these objects, sizes or processes relative to one another. Should a dependency and/or sequence be necessary, this is explicitly stated here or it is evident for the person skilled in the art to study the specifically described configuration. If a component can occur more than once ("at least one"), the description of one of these components can apply equally to all or part of the majority of these components, but this is not mandatory.

BRIEF DESCRIPTION OF THE DRAWINGS

The invention and the technical environment are explained in more detail below with reference to the accompanying figures. It should be pointed out that the invention is not intended to be limited by the exemplary embodiments mentioned. In particular, unless explicitly stated otherwise, it is also possible to extract partial aspects of the facts explained in the figures and to combine them with other components and findings from the present description. In particular, it should be pointed out that the figures and in particular the proportions shown are only schematic. In the figures:

Detained Description of the Invention FIG. 1 shows a first embodiment variant of a device 1. FIG. 2 shows part of the device 1 according to FIG. 1 in a side view in section. FIGS. 1 to 2 are described together below.

Figure 1:
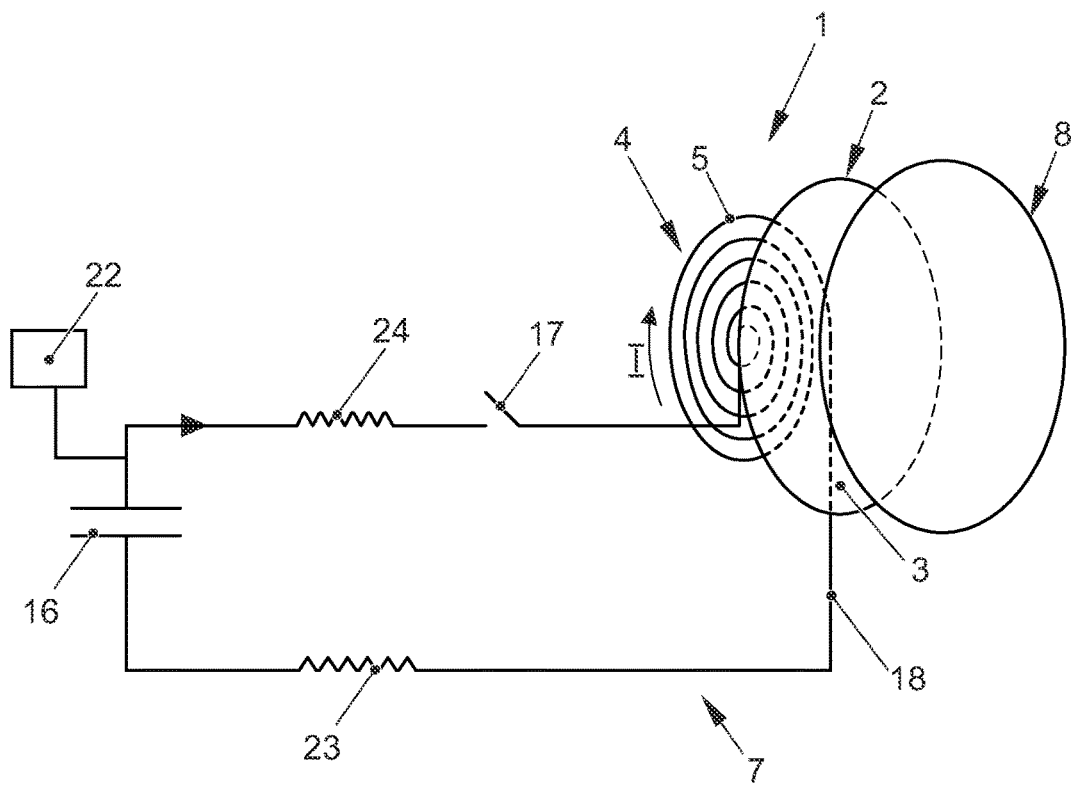
FIG. 1: shows a first embodiment variant of a device.

The device 1 comprises a first coil body 4, the electrical conductor 5 of which is arranged in a plane 6, an electrical circuit 7 for providing a pulsed electrical current which can be applied to the electrical conductor 5 of the first coil body 4, a die 8 with a support 9 facing the first coil body 4 for an initial part 3 to be reshaped, the support 9 having the shape of the component 2 to be produced, and a first separating device 10 by which a first partial area 11 can be separated from a second partial area 12 of the initial part 3.

The device 1 is designed so that the initial part 3 can be arranged between the first coil body 4 and the die 8, in particular on the die 8, and can be at least partially accelerated towards the die 8 by an electromagnetic force acting between the first coil body 4 and the initial part 3 and thereby can be deformed by the support 9 and can be severed by the first separating device 10.

The electrical circuit 7 comprises a first circuit 18 in which at least one inductor 24, a power resistor 23, a capacitor 16 and the first coil body 4 are arranged. The electrical conductor 5 of the first coil body 4 has a plurality of windings.

The pulsed electrical current provided by the electrical circuit 7 generates a magnetic field in the first coil body 4, which in turn induces an electrical current in the initial part 3.

Thus, a Lorentz force, by means of which the initial part 3 is at least partially accelerated towards the die 8 or is applied to the die 8 and the support 9 for reshaping, is generated between the initial part 3 and the first coil body 4. The high speed of the initial part 3 achieved in this way enables reshaping of the initial part 3 by the die 8, that is to say the adaptation of the shape of the output part 3 to the shape of the support 9.

In addition to the reshaping of the starting material 3, a second partial area 12 is also detached from a first partial area 11. The detachment includes cutting into the initial part 3, this cut being arranged at a distance from an outer edge of the initial part 3. The detachment here comprises the removal of the second partial area 12 designed as a border area.

The first separating device 10 has a circumferential separating edge 13, so that the separating edge 13 completely surrounds the first partial area 11 and the first partial area 11 can be detached from the second partial area 12. The separating edge 13 completely surrounds the support 9. The first partial area 11 forms the component 2, the second partial area 12 being disposed of as material residue. For this purpose, the device 1 comprises a material chute 20, by which the detached second partial area 12 is automatically removed from the device 1 under the influence of gravity 21.

The separating edge 13 of the first separating device 10 is arranged in a stationary manner on the die 8. The initial part 3 is pressed against the die 8 as a result of the pulsed electrical current, the initial part 3 also being pressed against the separating edge 13 and the separating process thus taking place. This means that the reshaping and separation can take place at the same time.

The electrical circuit 7 is activated via the control unit 22.

Figure 2:
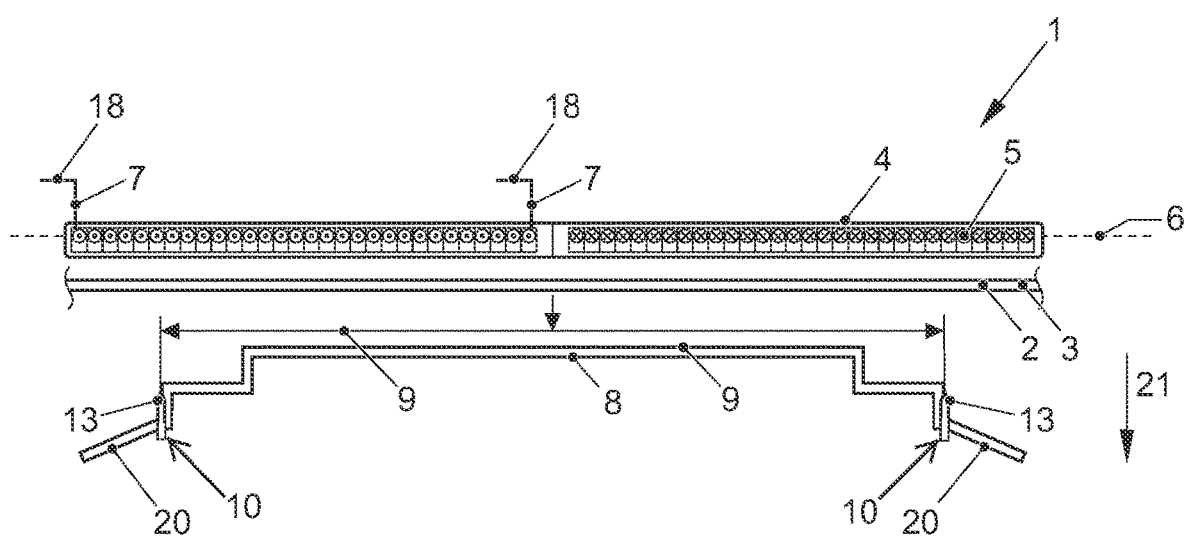
FIG. 2: shows a part of the device according to FIG. 1 in a side view in section.
Figure 3:
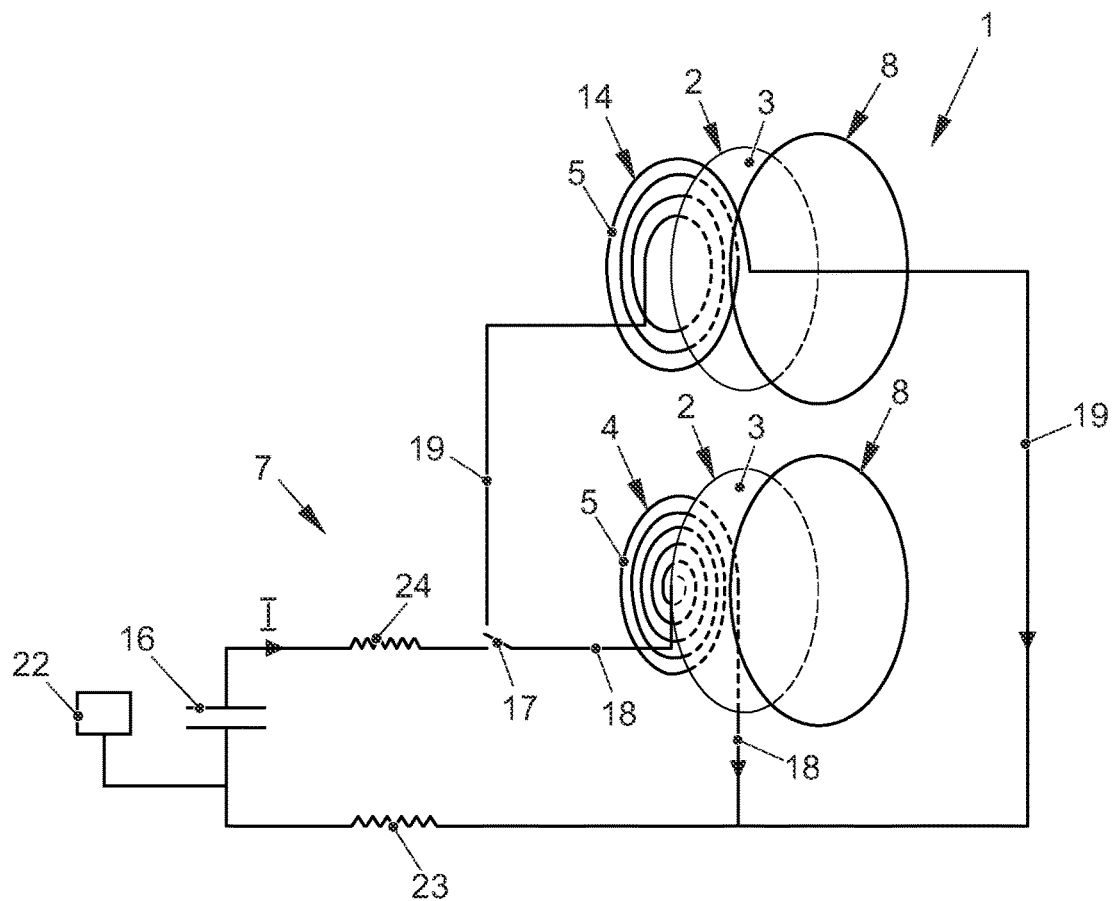
FIG. 3: shows a second embodiment variant of a device.
Figure 4:
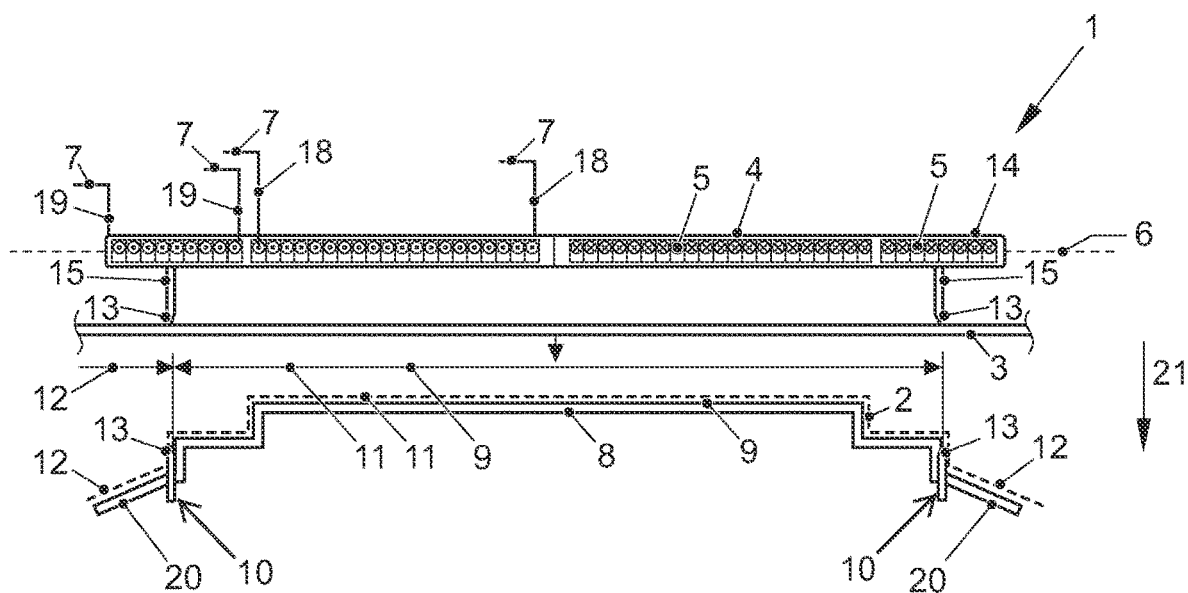
FIG. 4: shows a part of the device according to FIG. 3 in a side view in section.

FIG. 3 shows a second embodiment variant of a device 1. FIG. 4 shows part of the device 1 according to FIG. 3 in a side view in section. FIGS. 3 to 4 are described together below. Reference is made to the statements relating to FIGS. 1 and 2.

In contrast to the first embodiment variant, the device 1 here comprises an electrical circuit 7 with an additional second circuit 19. A second coil body 14 is arranged in the second circuit 19, it being possible to switch back and forth between the first circuit 18 and the second circuit 19 via a switch 17.

The device 1 thus additionally comprises a second coil body 14 and a second separating device 15, the second separating device 15 being movable by the second coil body 14 towards the die 8. The first separating device 10 is arranged on the die 8.

The separating devices 10, 15 are arranged such that the movably arranged second separating device 15 and the first separating device 10 arranged on the die 8 interact with their separating edges 13 and thereby form a common cutting line on the initial part 3.

The second coil body 14 completely surrounds the first coil body 4 and the electrical conductors 5 of the coil bodies 4, 14 are arranged in the common plane 6, the electrical circuit 7 being designed so that the pulsed electrical current can be applied to the coil bodies 4, 14 only one after the other. The electrical circuit 7 is thus constructed very simply and cost-effectively, providing for switching alternately between the first coil body 4 and the second coil body 14.

LIST OF REFERENCE SIGNS 1 device
2 component
3 initial part
4 first coil body
5 conductor
6 plane
7 circuit
8 die
9 support
10 first separating device
11 first partial area
12 second partial area
13 separating edge
14 second coil body
15 second separating device
16 capacitor
17 switch
18 first circuit
19 second circuit
20 material chute
21 gravity
22 control unit
23 power resistor
24 inductor

The invention claimed is:

1. A device for producing a thin-walled component from an initial part, comprising:
a first coil body having a first electrical conductor that is arranged at least in one plane,
a second coil body having a second electrical conductor that is arranged at least in a second plane,
an electrical circuit for providing a pulsed electrical current, which pulsed electrical current can be applied to the first electrical conductor of the first coil body and to the second electrical conductor of the second coil body,
a die with a support facing the first coil body for the initial part to be reshaped, the support having an identical shape of the thin-walled component to be produced, and
a blade by which a first partial area can be at least partially cut from a second partial area of the initial part,
wherein the initial part is first arranged between the first coil body and the die, and
wherein an electromagnetic force acting between the first coil body and the initial part accelerates the initial part towards the die and between the second coil body and the blade accelerates the blade towards the die,
whereby the initial part is deformed by the support and at least partially cut by the blade.

2. The device according to claim 1, wherein the blade is circumferential and completely surrounds the first partial area, so that the first partial area can be cut from the second partial area.

3. The device according to claim 2, wherein the blade completely encloses the support.

4. The device according to claim 1, wherein the blade opposes the support and is configured to be movable towards the die.

5. The device according to claim 4,
wherein the second coil body completely surrounds the first coil body,
wherein the electrical conductors of the first and second coil bodies are arranged in a common plane, and
wherein the electrical circuit is designed so that the pulsed electrical current can be applied to the first and second coil bodies only one after the other.

6. The device according to claim 1, wherein the component is a housing film for a pouch cell.

7. The device according to claim 4, further comprising a second blade, wherein the second blade is arranged on or adjacent to the die, whereby the electromagnetic force acting between the first coil body and the initial part accelerates the initial part towards the die, such that the initial part is deformed by the support and at least partially cut by the second blade.

8. The device according to claim 1, wherein the blade is configured to be movable towards the die.

9. The device according to claim 8, wherein the blade is configured to be accelerated together with the initial part towards the die by the same pulsed electrical current.

10. A method for producing a thin-walled component from an initial part with a device, the device comprising
a first coil body having a first electrical conductor that is arranged at least in one plane,
a second coil body having a second electrical conductor that is arranged at least in a second plane,
an electrical circuit for providing a pulsed electrical current, which pulsed electrical current can be applied to the first electrical conductor of the first coil body and to the second electrical conductor of the second coil body,
a die with a support facing the first coil body for the initial part to be reshaped, the support having an identical shape of the thin-walled component to be produced, and
a blade by which a first partial area can be at least partially cut from a second partial area of the initial part,
the method comprising the following steps:
a) providing the initial part and arranging the initial part between the first coil body and the die;
b) applying the pulsed electrical current to the first coil body and generating an electromagnetic force between the first coil body and the initial part so that the initial part is accelerated towards the die and to the blade and generating an electromagnetic force between the blade and the initial part so that the blade is accelerated towards the die;

c) reshaping the initial part, and d) at least partially cutting the initial part with the blade.

11. The method according to claim 10, wherein steps c) and d) are carried out at the same time.

12. The method according to claim 10, wherein steps c) and d) are carried out with a temporal offset, such that step c) is carried out by a first pulsed electrical current and step d) is carried out by a temporally offset second pulsed electrical current.

13. The method according to claim 10, wherein the component is a housing film for a pouch cell.

14. A device for producing a thin-walled component from an initial part, comprising:

a first coil body having a first electrical conductor that is arranged at least in a first plane, a second coil body having a second electrical conductor that is arranged at least in a second plane, an electrical circuit for providing at least one pulsed electrical current, which at least one pulsed electrical current can be applied to the first electrical conductor of the first coil body and to the second electrical conductor of the second coil body, a die with a support facing the first coil body for the initial part to be reshaped, the support having an identical shape of the thin-walled component to be produced, and a first blade arranged on or adjacent to the die and a second blade movable by the second coil body towards the die, by each of which a first partial area of the initial part can be at least partially cut from a second partial area of the initial part, wherein the initial part is first arranged between the first coil body and the die, wherein an electromagnetic force acting between the first coil body and the initial part accelerates the initial part towards the die, and an electromagnetic force acting between the second coil body and the second blade accelerates the second blade towards the die, is deformed by the support and at least partially cut by the first blade and/or the second blade.

* * * * *